United States Patent [19]

Arai

[11] Patent Number: 4,847,695

[45] Date of Patent: Jul. 11, 1989

[54] IMAGE PROCESSING APPARATUS IN WHICH THE MINIMUM AND MAXIMUM WIDTHS OF A PULSE-WIDTH MODULATED SIGNAL CAN BE INDEPENDENTLY ADJUSTED IN ACCORDANCE WITH PREDETERMINED DATA SIGNALS

[75] Inventor: Hitoshi Arai, Yokohama, Japan

[73] Assignee: Canon Kabushiki Kaisha, Tokyo, Japan

[21] Appl. No.: 10,539

[22] Filed: Feb. 3, 1987

[30] Foreign Application Priority Data

Feb. 6, 1986 [JP] Japan ................................. 61-022835
Apr. 3, 1986 [JP] Japan ................................. 61-075482
Apr. 3, 1986 [JP] Japan ................................. 61-075483

[51] Int. Cl.⁴ .............................................. H04N 1/40
[52] U.S. Cl. .................................... 358/455; 358/298; 358/443
[58] Field of Search ........................ 358/280, 283, 298

[56] References Cited

U.S. PATENT DOCUMENTS

| | | | |
|---|---|---|---|
| 3,463,880 | 8/1969 | Corson | 358/283 |
| 3,646,262 | 2/1972 | Moe | 358/283 |
| 4,149,183 | 4/1979 | Pellar et al. | 358/283 |
| 4,763,199 | 8/1988 | Suzuki | 358/283 |
| 4,782,398 | 11/1988 | Mita | 358/283 |
| 4,800,442 | 1/1989 | Riseman et al. | 358/283 |

FOREIGN PATENT DOCUMENTS 56-94874 7/1981 Japan ................................. 358/283

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus includes a D/A converter for generating an analog image signal, a variable resistor for changing an output range of the analog image signal generated by the D/A converter, and a comparator for processing the analog image signal generated by the variable resistor by using an analog pattern signal and for outputting a pulse width modulated signal. The analog pattern signal may be a triangular wave signal, a saw-tooth wave signal, a sine wave signal, or a trapezoidal wave signal. In another version, selection is performed between predetermined data and a generated image signal and the selected signal is processed using an analog pattern signal (e.g., a triangle wave) to output a pulse width modulated signal. A D/A converter may be used to convert the output of the selection. The output range of the DAC may be variable.

16 Claims, 13 Drawing Sheets

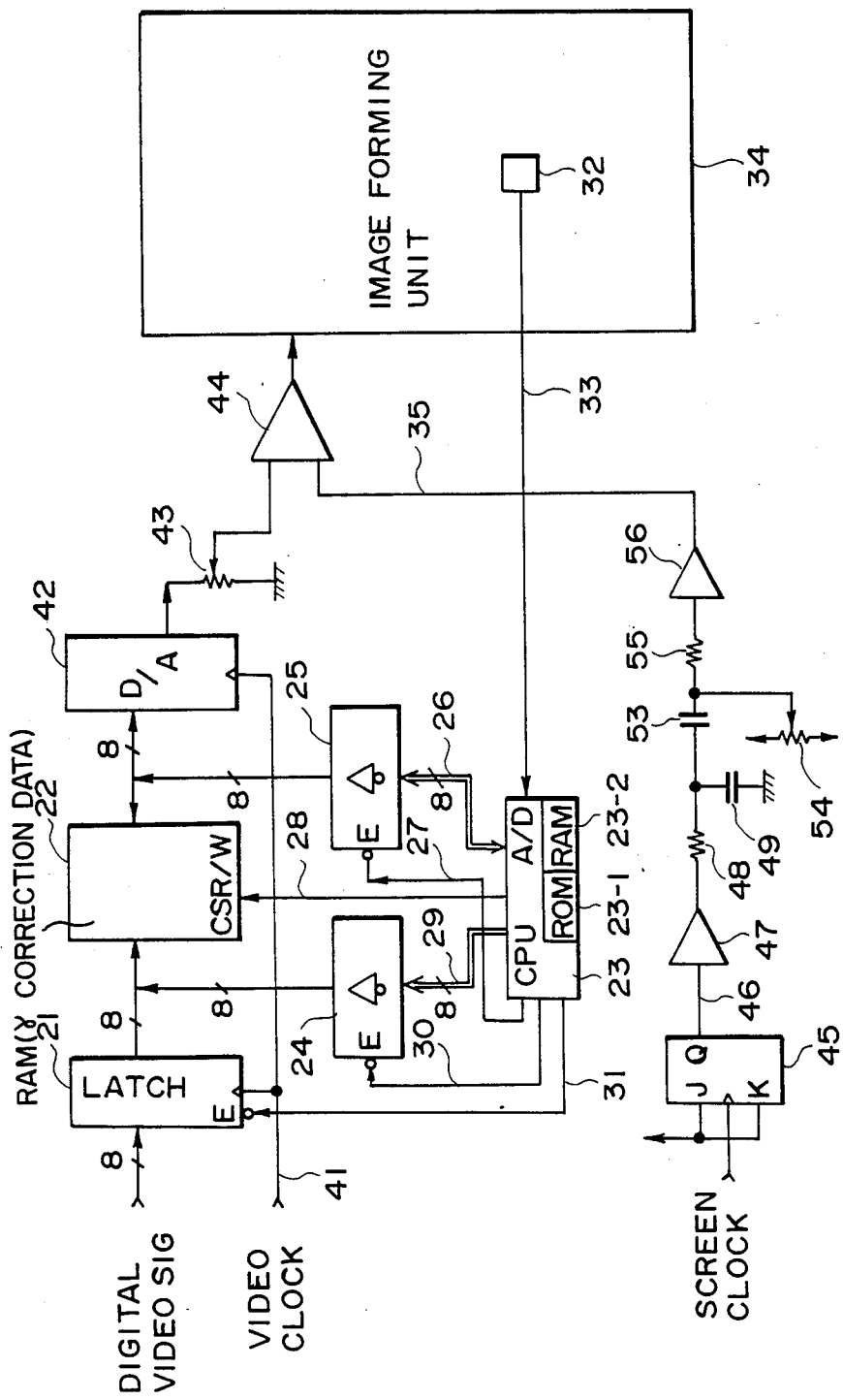
F I G. 6

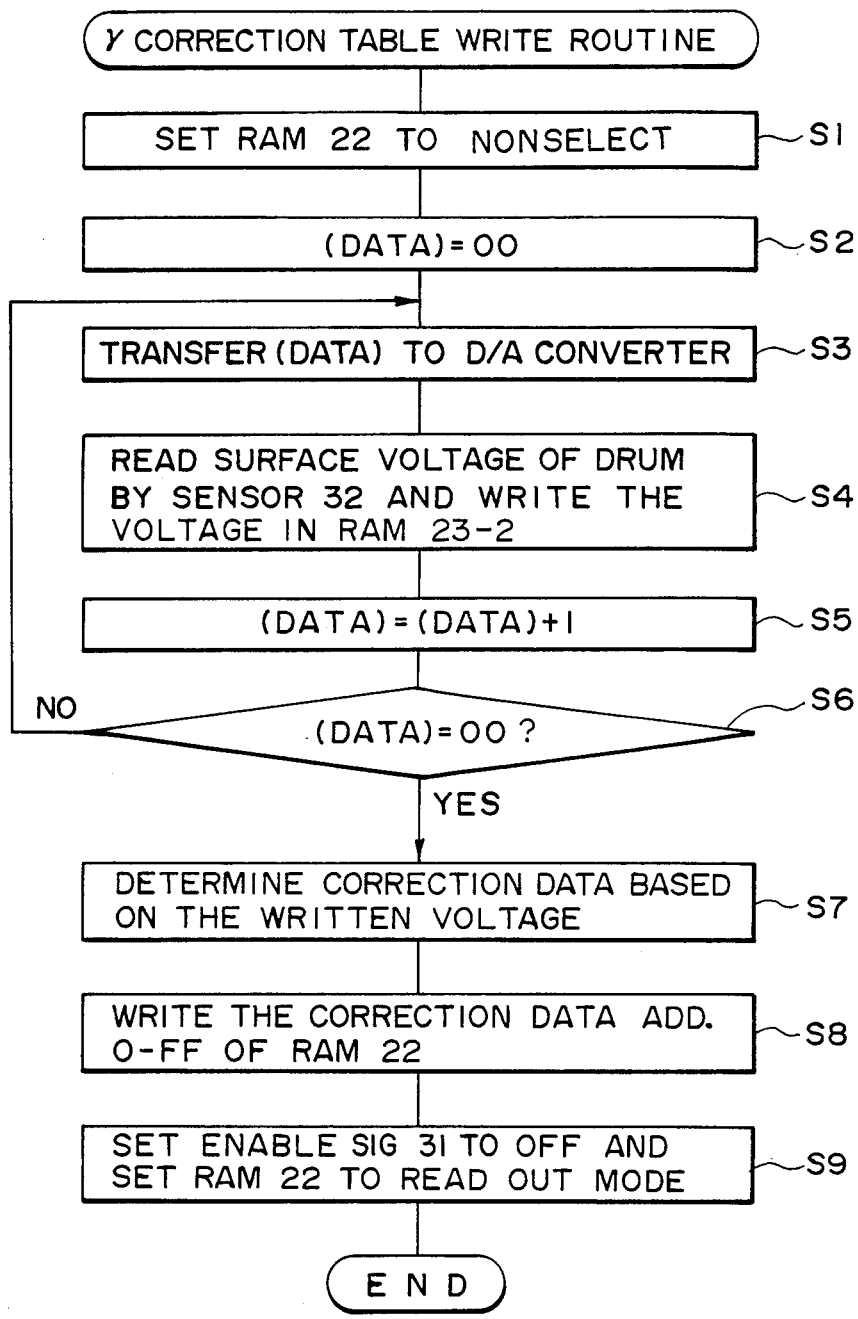
F I G. 10

IMAGE PROCESSING APPARATUS IN WHICH THE MINIMUM AND MAXIMUM WIDTHS OF A PULSE-WIDTH MODULATED SIGNAL CAN BE INDEPENDENTLY ADJUSTED IN ACCORDANCE WITH PREDETERMINED DATA SIGNALS

BACKGROUND OF THE INVENTION

1. Field of the Invention

The present invention relates to an image processing apparatus for reproducing an image.

2. Related Background Art

The assignee of the present invention has previously proposed a technique for forming a halftone image at a laser beam printer or the like, wherein an input digital image signal is converted into an analog image signal, and the analog image signal is compared with a periodic analog pattern signal such as a triangle wave signal to produce a PWM image signal.

An example of this technique is shown in FIG. 3. Eight input digital video signal bits VD0 to VD7 are latched by a latch circuit 1 in response to a video clock signal CLK/2 obtained by dividing a master clock signal CLK into $\frac{1}{2}$ and with a JK flip-flop (FF) 5 are synchronized. The latched video signal is converted into an analog video signal VA by a D/A converter 2. The analog video signal VA is input to the noninverting input terminal of a comparator (CMP) 4. The input terminal is also connected to one end of a resistor 3.

The master clock signal CLK is frequency-divided by a JK flip-flop (FF) 8 into pattern clock signals PCLK each having a 50% duty ratio. The pattern clock signal PCLK is input to an integrator through a buffer 9. The integrator comprises a variable resistor 10' and a capacitor 11. The pattern clock signal PCLK is integrated into a triangle wave signal (analog pattern signal) SAW having the same period as that of the pattern clock signal PCLK. The bias component of the triangle wave signal SAW is controlled by a capacitor 12 and a variable resistor 13. The triangle wave signal SAW then passes through a protective resistor 14 and a buffer amplifier 15. The triangle wave signal SAW from the buffer amplifier 15 is input to the inverting input terminal of the comparator 4. The comparator 4 compares the level of the analog video signal VA with the level of the triangle wave signal SAW. The analog video signal VA is PWM-modulated according to its density.

In order to obtain good gradation, the amplitude levels of the analog video signal VA and the triangle wave signal SAW preferably satisfy the relationship shown in FIG. 4. More specifically, the maximum level VAmax (e.g., the black level) of the analog video signal VA coincides with the peak level of a triangle wave signal SAW1, and at the same time, a minimum level VAmin (e.g., the white level) of the analog video signal VA coincides with the bottom level of the triangle wave signal SAW1. Therefore, maximum resolution and linearity in the full scale can be obtained.

However, in practice, even the white level requires a small number of laser beam pulses due to problems associated with the response time of a semiconductor laser element and the sensitivity of a photosensitive drum. Similarly, the black level may not often require a continuous laser beam. In order to obtain a high gradation or tonality output level, a first predetermined pulse width is required even for the white level, and a second predetermined pulse width is required even for the black level. This is mostly due to the response time of the semiconductor laser element, and details thereof are described in U.S. application Ser. No. 051,154, filed May 18, 1987, now U.S. Pat. No. 4,800,442, which is a continuation of U.S. application Ser. No. 931,941, filed Nov. 19, 1986, now abandoned, which is a continuation of U.S. application Ser. No. 765,938, filed Aug. 18, 1985, now abandoned.

FIG. 5 is a timing chart for explaining the control technique for the circuit of FIG. 3. Assume that the bias of the triangle wave signal is set to be SAW2 by the variable resistor 13 so as to obtain a small number of laser beam pulses even if D/A input data $00_H$ (H denotes the hexadecimal notation) for the white level is input. In this case, the white level pulse width is given as w. However, reproducibility of a gray scale level near the black level is degraded in this condition. D/A input data $FF_H$ is input to cause the variable resistor 10' to control the amplitude of the triangle wave signal. The resultant triangle wave signal is SAW3. However, the peak level of the triangle wave signal is also changed. At the same time, the pulse width for the white level is also spread in a direction of arrow a. Therefore, a target value cannot be easily obtained, and a long trial-and-error period is undesirably required.

SUMMARY OF THE INVENTION

It is an object of the present invention to eliminate the conventional drawback described above.

It is another object of the present invention to provide an image processing apparatus.

It is still another object of the present invention to provide an image processing apparatus capable of high-quality image reproduction.

It is still another object of the present invention to provide an image processing apparatus capable of reproducing a good image with a simple arrangement.

It is still another object of the present invention to provide an image processing apparatus capable of high-quality image reproduction at high speed.

It is still another object of the present invention to provide an image processing apparatus capable of determining pulse width characteristics of a reproduced signal with a simple arrangement according to a simple technique.

It is still another object of the present invention to provide an image processing apparatus capable of easily controlling levels of image data and a reference signal.

The above and other objects, features, and advantages of the present invention will be apparent from the following detailed description of the preferred embodiments taken in conjunction with the accompanying drawings.

BRIEF DESCRIPTION OF THE DRAWINGS

FIG. 6 is a block diagram of an image processor in an image forming apparatus according to a second embodiment of the present invention;

FIG. 10 is a flow chart for explaining γ correction table write processing;

DETAILED DESCRIPTION OF THE PREFERRED EMBODIMENTS

The preferred embodiments of the present invention will be described in detail with reference to the accompanying drawings.

(First Embodiment)

Figure 1:
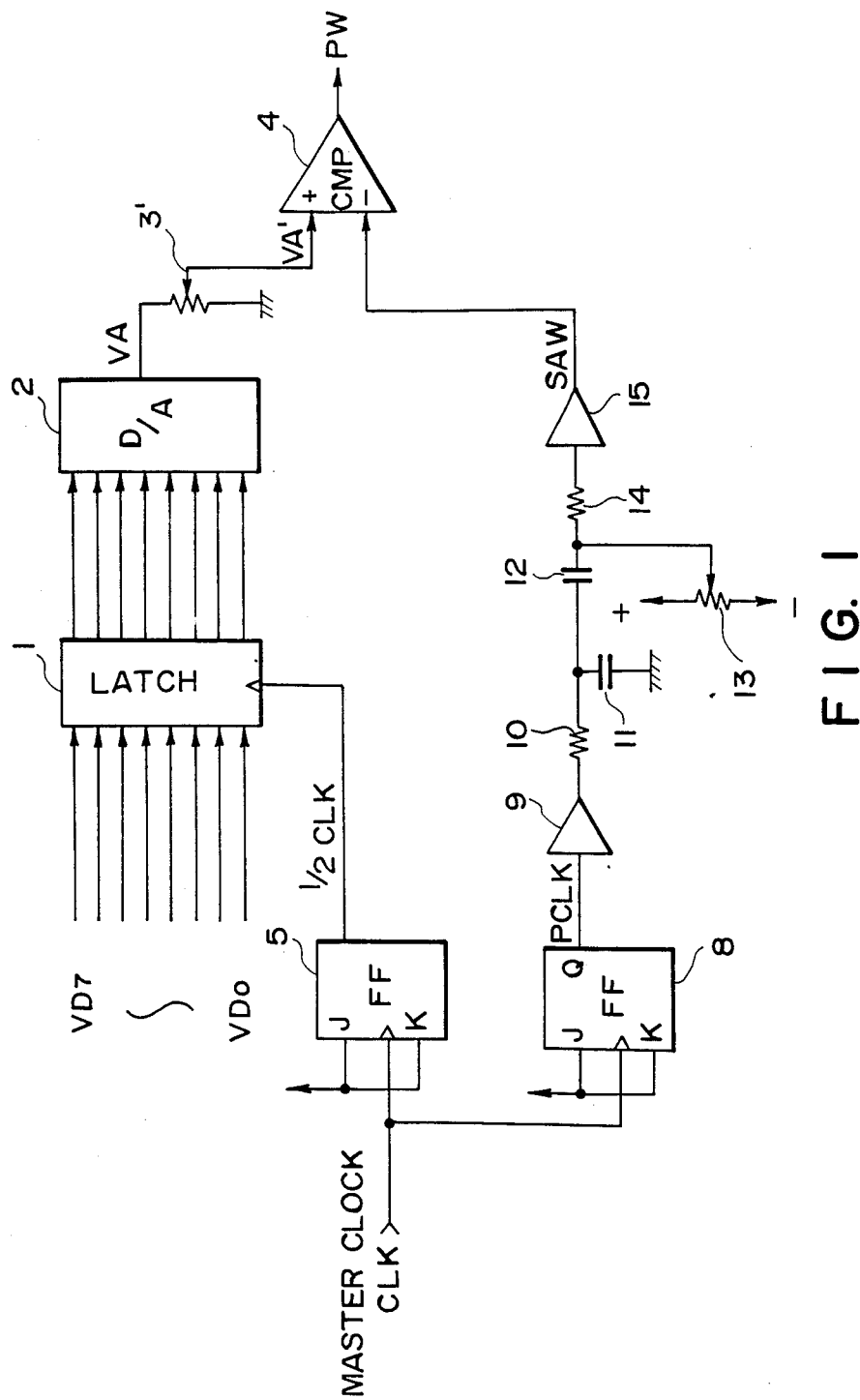
FIG. 1 is a circuit diagram of a pulse width modulator in an image processing apparatus according to a first embodiment of the present invention.
Figure 2A:
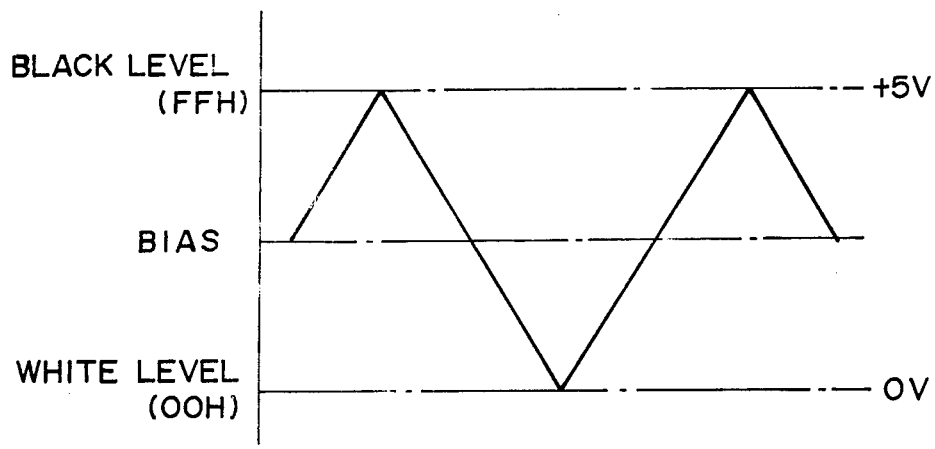
FIGS. 2A and 2B are charts showing waveforms to explain the control technique of the circuit in FIG. 1.
Figure 2B:
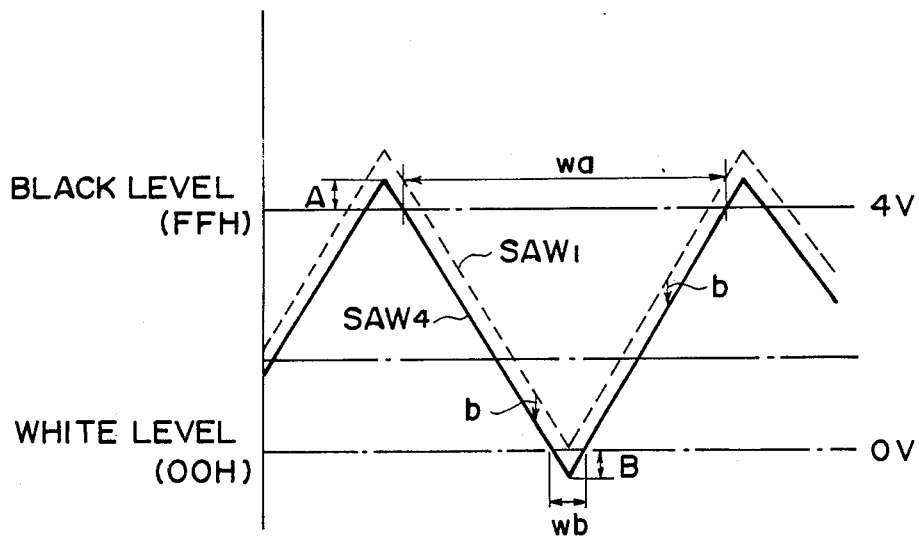
Figure 3:
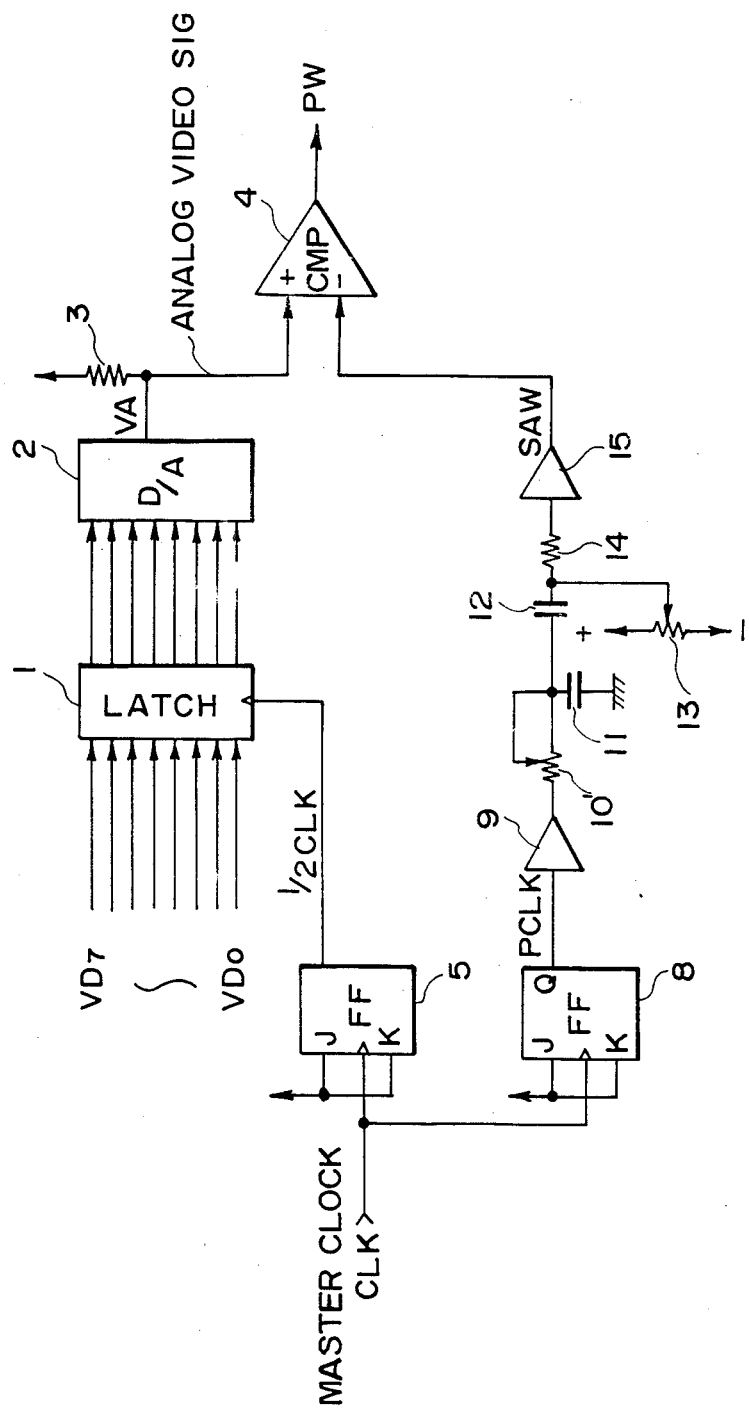
FIG. 3 is a circuit diagram showing a detailed arrangement of a prior-art pulse width modulator.
Figure 4:
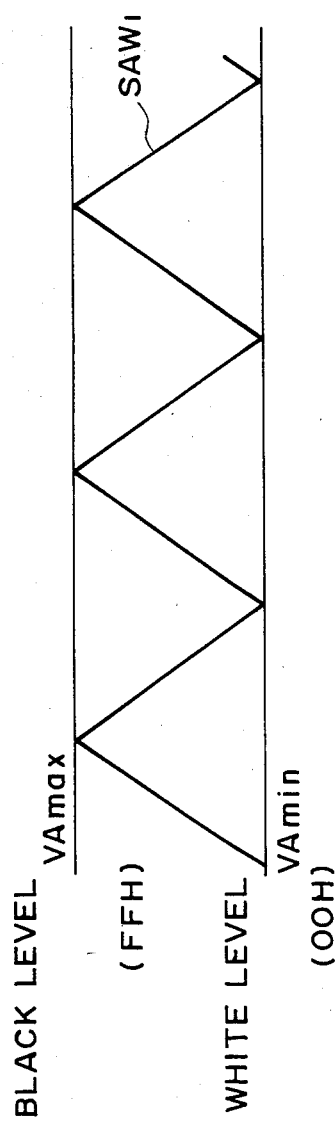
FIG. 4 is a graph showing an ideal relationship between the triangle wave signal level and the analog image signal level.
Figure 5:
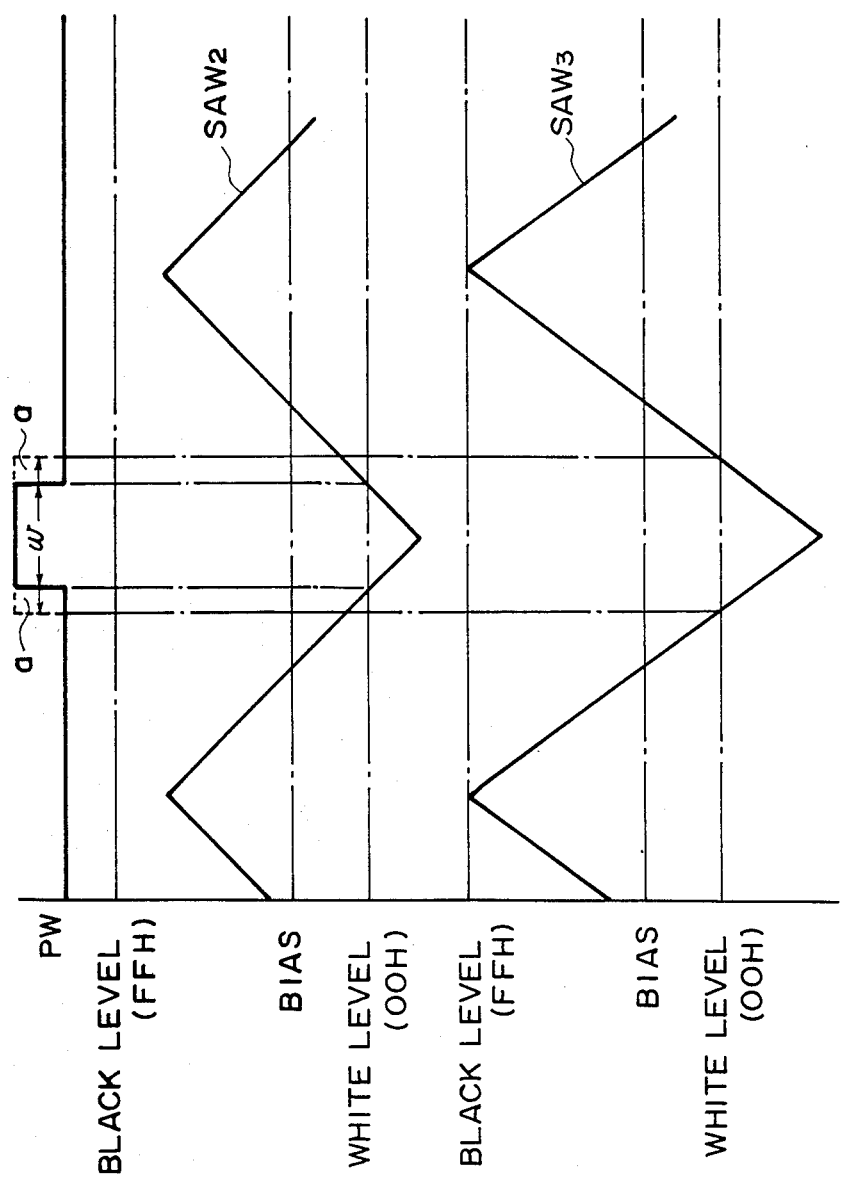
FIG. 5 is a timing chart for explaining the control technique of the circuit shown in FIG. 3.

FIG. 1 and FIGS. 2A and 2B show a first embodiment of the present invention, in which FIG. 1 is a circuit diagram of a pulse width modulator in an image processing apparatus thereof, and FIGS. 2A and 2B are charts showing waveforms to explain the control technique of the circuit shown in FIG. 1. The same reference numerals as in FIG. 3 denote the same parts in FIG. 1, and a detailed description thereof will be omitted. Referring to FIG. 1, a variable resistor 3' is arranged to set substantially a maximum amplitude (full scale range) VA' of an analog image signal. For the sake of simplicity, the black level of the analog image signal VA is set to be +5V, its white level is set to be 0 V, and the resistance of the variable resistor 3' is set at 1 kΩ. Therefore, the amplitude of the triangle wave signal SAW is 5 V, as shown in FIG. 2A. In this state, the bias level of the triangle wave signal is shifted by an amount b by a variable resistor 13 from SAW1 to SAW4. The variable resistor 3' is then operated such that a substantially maximum amplitude VA' of the analog image signal VA satisfies the relation {(amplitude of triangle wave signal SAW)−(A+B)}, where A is the amplitude corresponding to a pulse width wa required for the black level, and B is the amplitude corresponding to a pulse width wb required for the white level. Since the amplitude of the triangle wave signal SAW is always 5 V, the values A and B can be easily obtained by a geometric relationship, as shown in FIG. 2B. When the maximum amplitude VA' is obtained, the variable resistor 3' is controlled to obtain an amplitude value of 4 V. In this case, the resistance is 200 ohms, and the variable resistance range is divided into 4:1. In this manner, the pulse widths wa and wb of the black and white levels can be easily obtained. Since the relationship between the image signal and the triangle wave signal can be easily set according to the characteristics of the semiconductor laser, the gray scale level range of the image signal can be widened, and an image of high quality can thus be reproduced.

According to this embodiment, desired pulse width characteristics can be obtained without repetition of complicated operations. This technique does not require skill and experience. In addition, the matching between the triangle wave level and the analog signal level can be accurate according to the characteristics of the recording apparatus. As a result, a higher gradation output level can be obtained, and a good image can be reproduced.

(Second Embodiment)

Figure 7:
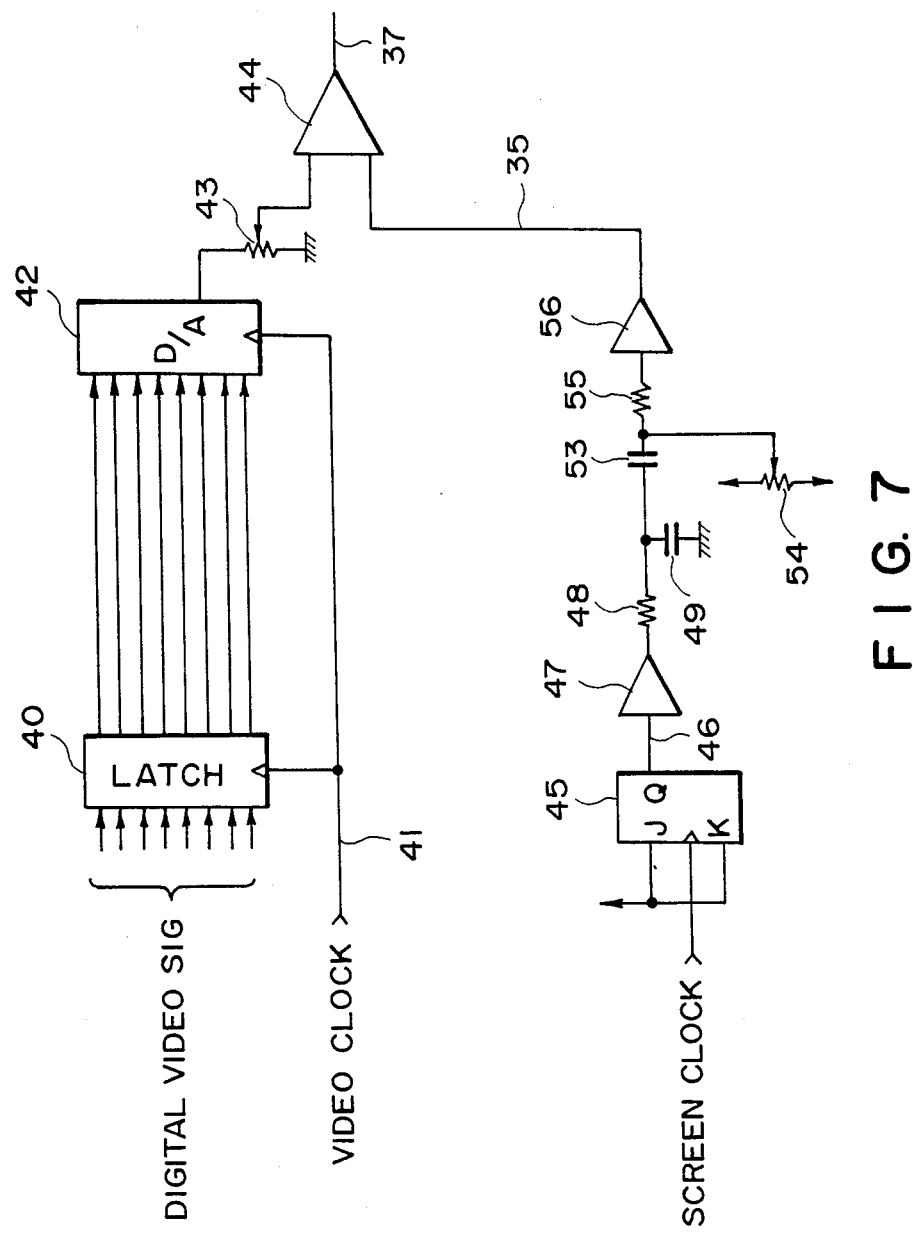
FIG. 7 is a block diagram of an image processor for generating a PWM signal.
Figure 8:
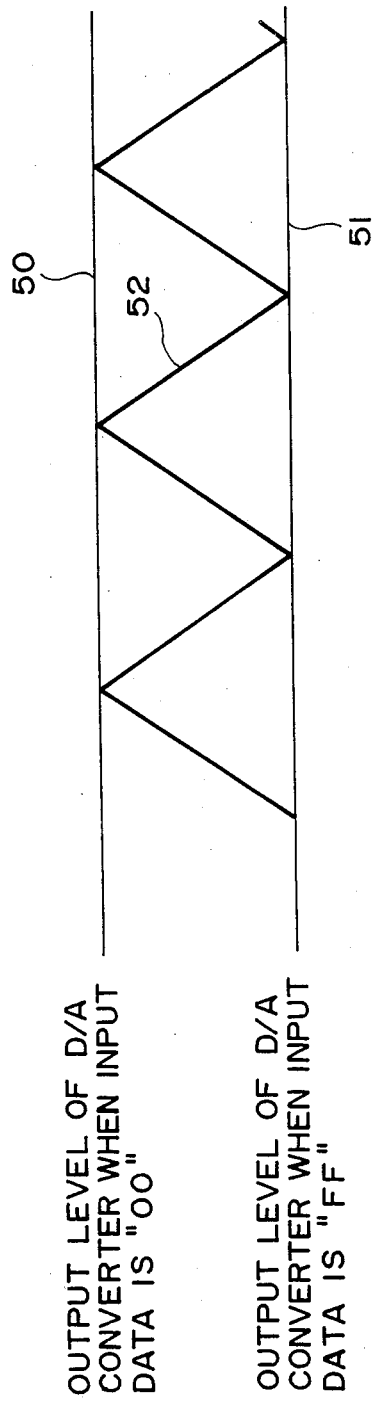
FIG. 8 is a chart showing conditions of levels of the analog video signal and the triangle wave.

The assignee of the present invention has proposed the technique for forming a halftone image at a laser beam printer or the like, wherein an input digital image signal is converted into an analog image signal, and the analog image signal is compared with a periodic analog pattern signal such as a triangle wave signal to produce a PWM image signal, as previously described (FIG. 1). In order to obtain a high gradation output level, the relationship between the levels of analog video signals 50 and 51 as outputs from a D/A converter and the level of a triangle wave 52 is given, as shown in FIG. 8, such that a triangle wave 52 preferably falls within the range between the maximum analog video signal and the minimum analog video signal. For this purpose, an image processor shown in FIG. 7 is proposed.

The image processor will be described with reference to FIG. 7.

An 8-bit digital video signal is latched by a latch circuit 40 in response to video clocks 41. The video clock 41 is a clock synchronized with a digital video signal sent from, e.g., an image scanner (not shown). The digital video signal is converted into an analog video signal by a D/A converter 42. The voltage level of the analog video signal is controlled by a variable resistor 43. The voltage signal is input to one input terminal of a comparator 44. A screen clock is divided into ½ by a frequency divider 45. The resultant clock constitutes a clock signal 46 having a 50% duty ratio. The screen clock is also synchronized with the video clock 41. The screen clock is sent from, e.g., an image scanner (not shown). The clock signal 46 is supplied to an integrator through a buffer 47. The integrator comprises a resistor 48 and a capacitor 49. The integrator generates a triangle wave. The bias component of the triangle wave signal is controlled by a capacitor 53 and a variable resistor 54. The resultant signal is supplied to a protective resistor 55 and a buffer amplifier 56. A triangle wave 35 from the buffer amplifier 56 is supplied to the other input terminal of the comparator 44. The triangle wave signal 35 is compared by the comparator 44 with the analog video signal supplied from the D/A converter 42. The comparator 44 then performs pulse width modulation. In other words, a pulse width modulated signal 37 is output from the comparator 44.

Figure 9:
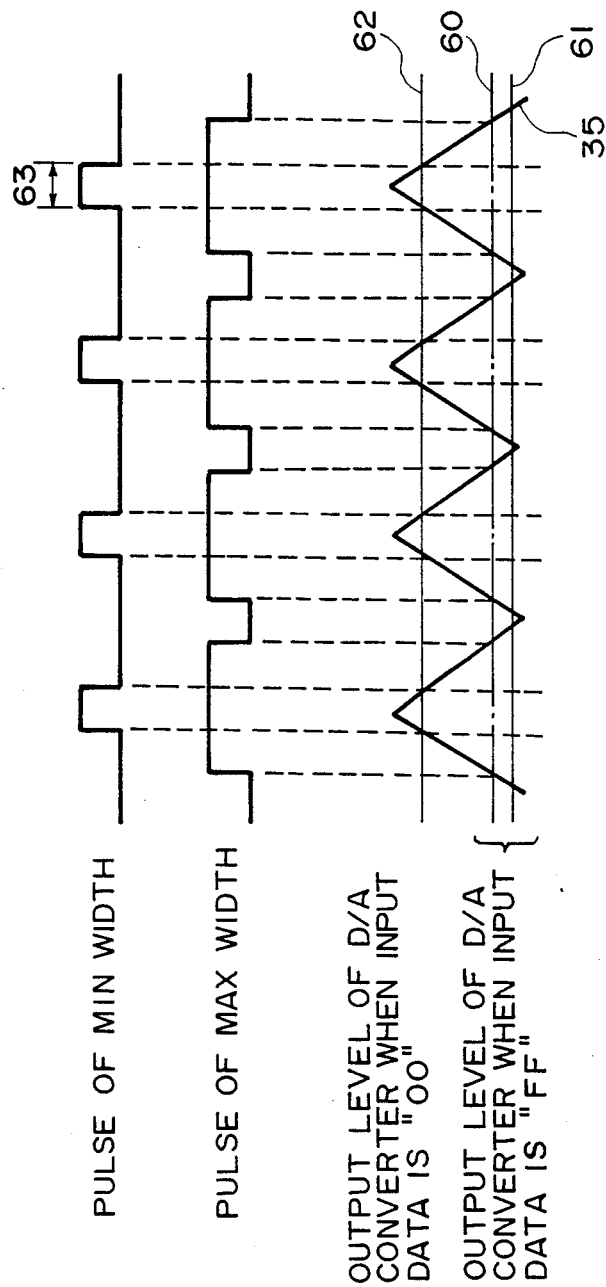
FIG. 9 is a timing chart for explaining pulse width control.

In order to maintain the high gradation output level as described above, the relationship between the analog signal and the pattern signal in FIG. 8 is required. However, in practice, the relationship between the maximum and minimum pulse widths in FIG. 9 is desired in consideration of the problems associated with the response time of the semiconductor laser and the sensitivity of the photosensitive drum. This relationship is controlled by the offset control variable resistor 54 in the integrator and the output voltage control variable resistor 43 in the D/A converter 42. In other words, the 8-bit digital video signal is supplied from an input device (not shown). Data $00_H$ is input to cause the variable resistor 54 to determine the bias value of the triangle wave 35, i.e., the minimum pulse width 63. Similarly, data $FF_H$ is input from the input device (not shown) to cause the variable resistor 43 to change the output voltage of the D/A converter 42 from a voltage value 61 to a voltage value 60, thereby obtaining a desired maximum pulse width.

According to the control technique described above, 8-bit digital video data allows representation of 256 gray scale levels (i.e., level 0 to level 255). When a halftone image is to be reproduced, image quality is changed due to the changing characteristics of the photosensitive drum and the optical losses from the laser to the scanner and the drum. As is known in the conventional technique, γ correction is required to correct the gradation characteristics of the digital video signal. Demend has arisen for an image forming apparatus wherein γ correction values of video data components in the actual system can be calculated and the gray scale level correction of the video data can be performed.

(Description of Image Processor FIG. 6)

FIG. 6 is a block diagram of an image processor in an image forming apparatus according to a second embodiment of the present invention. The same reference numerals as in FIG. 7 denote the same parts in FIG. 6.

An 8-bit latch circuit 21 has an enable terminal and latches a digital video signal in response to the video clocks 41. When an enable signal 31 is set at low level, the data is sent from the latch circuit 21 to a RAM 22. The RAM 22 stores γ correction data. A CPU 23 comprises a microprocessor including a ROM 23-1 for storing control programs and data and a RAM 23-2 serving as a working area so as to control the image processor. The CPU 23 is connected to a tristate buffer 24 through an address bus 29 and to a tristate buffer 25 through a data bus 26. The CPU 23 supplies enable signals 27, 30, and 31 to the tristate buffers 25 24 and 24, and the latch circuit 21, respectively. The enable signals are active low. The CPU 23 also supplies a chip select (CS) and read/write (R/W) signal 28 to the RAM 22. A voltage sensor 32 is arranged to detect a surface voltage of a photosensitive drum in the image forming unit 34 and is connected to the A/D input terminal of the CPU 23. The CPU 23 receives an analog voltage signal from the voltage sensor 32 through a signal line 33 and converts it into a digital signal therein, thereby detecting the surface voltage of the drum. The image forming unit 34 such as a laser printer displays and outputs image data. The image forming unit 34 controls the ON/OFF operation of the laser beam in response to a PWM signal output from the comparator 44 and forms a latent image on the photosensitive drum.

Figure 11:
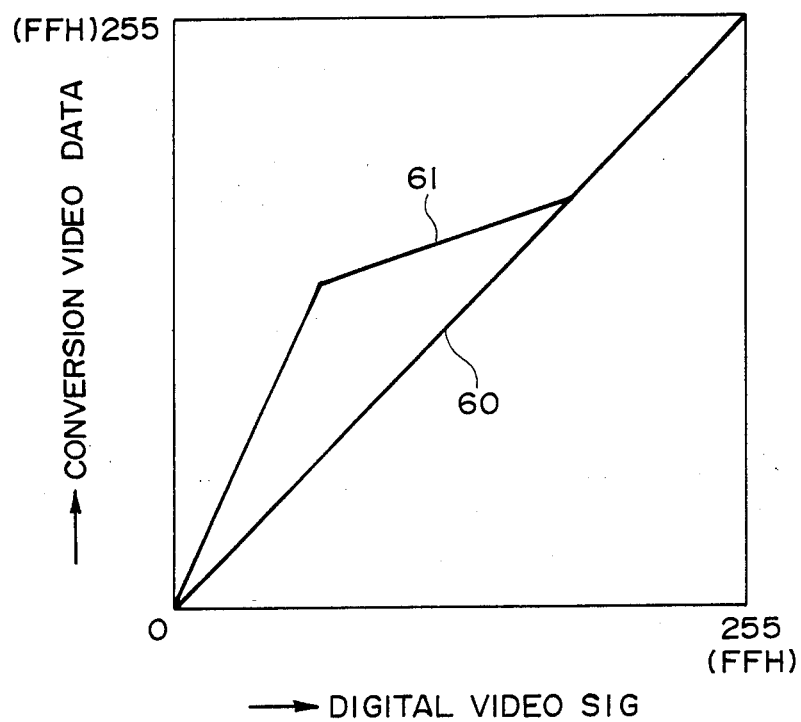
FIG. 11 is a graph showing the relationship between the input digital video signal and the conversion video data.

(γ Correction Table Write Processing (FIGS. 6, 10, and 11)

FIG. 10 shows a flow chart of write processing of the RAM 22 as the γ correction table under the control of the CPU 23. The program is stored in the ROM 23-1.

In step S1, the select signal (CS) for the RAM 22 is set in the non-select state by a control line 28, and an output from the RAM 22 is set to be a high impedance. In step S2, DATA as the 8-bit memory area of the RAM 23-2 is set to be 0. In step S3, the enable signal 27 is set at low level, and the content of the DATA of the RAM 23-2 is read out onto the data bus 26. The readout data is input to the D/A converter 42 through the tristate buffer 25. In step S4, the surface voltage of the drum is read by the voltage sensor 32, and the read value is stored in a predetermined area of the RAM 23-2 so as to correspond to the value of the DATA.

In step S5, the content of the DATA of the RAM 23-2 is incremented by one. In step S6, the contents of the DATA, i.e., values $0_H$ to $FF_H$ are transferred to the D/A converter 42. The corresponding voltage signals are read to check whether the potential signals are written in the predetermined area of the RAM 23-2.

In step S7, the correction values to be written in the RAM 22 are calculated on the basis of the voltage data stored in step S4. Since the ideal voltages for the video signals output in step S3 are known, the CPU 23 calculates the correction values by comparing the video data with the ideal values. In step S8, correction data signals calculated in step S7 are written at address 0 to address FF of the RAM 22. This write access can be achieved such that data to be written in the RAM 22 is addressed in response to address data stored in the tristate buffer 24. In this case, the enable signal 31 goes high to inhibit the output of the latch circuit 21. When the address and data signals for the RAM 22 are output, the select signal (CS) and the read write signal (R/W) are set at low level by the control line 28, thereby writing data in the RAM 22.

In step S9, the enable signal 31 goes low (i.e., active low) and the enable signals 27 and 30 go high when write access of the RAM 22 is completed. The select signal (CS) for the RAM 22 is set at low level, and the signal (R/W) is set at high level to set the RAM 22 in the read mode. Therefore, the write access of the RAM 22 is completed.

The 8-bit digital video signal is input in response to the video clocks 41 and is latched by the latch circuit 21. When an output from the latch circuit 21 is input as an address signal to the RAM 22, conversion video data representing the ideal characteristics of the drum voltage is read out in response to the digital video signal, as shown in FIG. 11.

Referring to FIG. 11, a line 60 represents that the surface voltage of the drum has perfect linearity with respect to the digital video signal and does not require conversion, i.e., the content of the RAM 22 is the same as that represented by the address data. A line 61 represents a conversion video data for the correction data for emphasizing the a portion having a low density.

In this embodiment, the measuring digital data is output from the CPU. However, the measuring digital data may be generated by other hardware.

According to this embodiment described above, the circuit includes a data generating means for sequentially generating data $00_H$ to $FF_H$. Drum voltages corresponding to the video signals generated by the data generating means are measured to obtain γ correction values. These values are used to correct the gray scale levels. Therefore, a good image can be produced without being influenced by optical variations of the drum and the optical system.

Although different types of γ correction tables are arranged in a ROM in a conventional arrangement and a large-capacity ROM is required, correction data for different types of apparatuses can be prepared in, e.g., a 256-byte RAM in this embodiment, thereby greatly reducing cost.

(Third Embodiment)

In the circuit shown in FIG. 7, as described above, pulse width adjustment digital data must be externally supplied, separate jigs are required, and the adjustment time is undesirably prolonged. When the apparatus requires readjustment due to the temporal changes in characteristics of the drum and the laser, even after the apparatus is adjusted once, a device for inputting special adjustment video data is undesirably required.

(Description of Image Processor (FIGS. 9 and 12))

Figure 12:
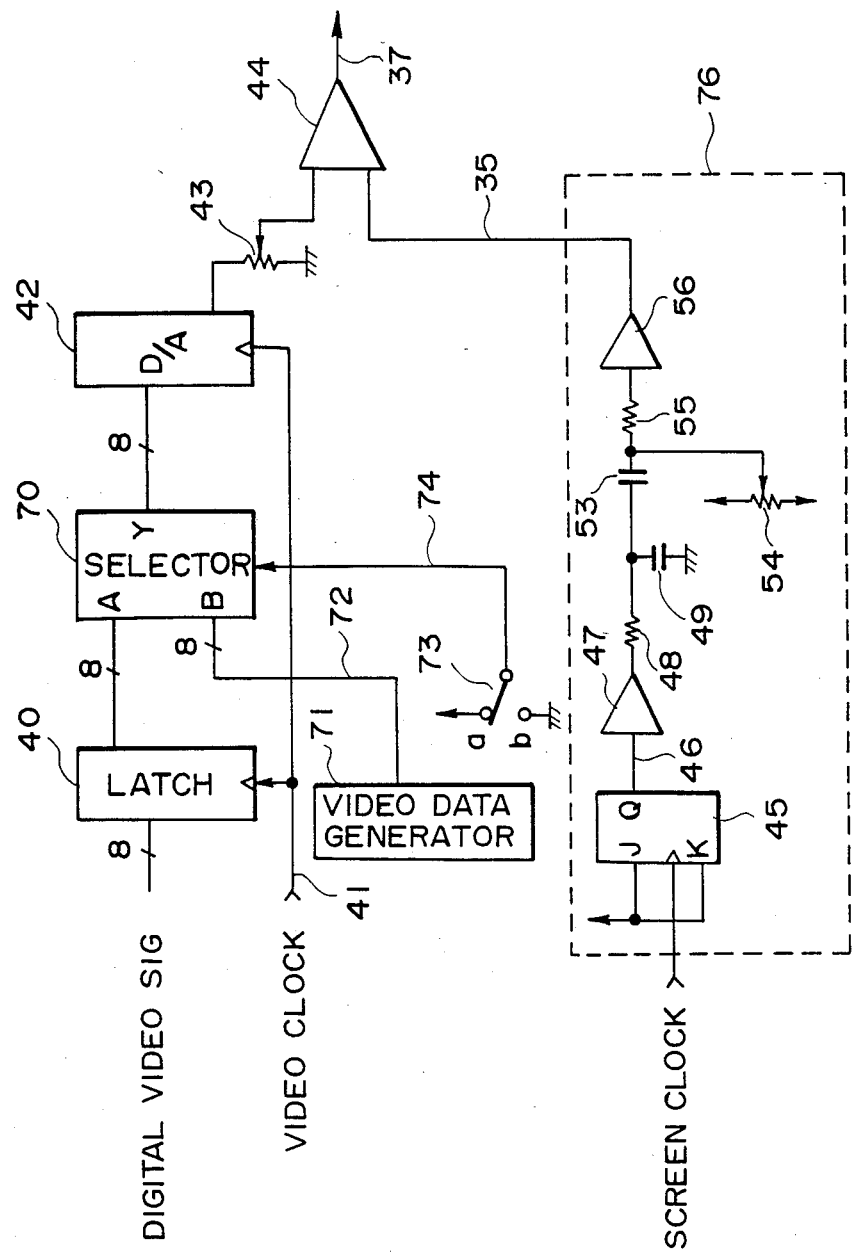
FIG. 12 is a block diagram of an image processor in an image processing apparatus according to a third embodiment of the present invention.

FIG. 12 is a block diagram of an image processor in an image processing apparatus according to a third embodiment of the present invention. The same reference numerals as in FIG. 7 denote the same parts in FIG. 12, and a detailed description thereof will be omitted.

The A input terminal of a selector 70 is connected from the output terminal of a latch circuit 40, and the B input terminal of the selector 70 is connected from a video data generator 71. The selector 70 selects one of the 8-bit video data from the latch circuit 40 and the data from the video data generator 71. The video data generator 71 generates any 8-bit video signal, i.e., one of the video signals representing the gray scale levels 0 to 255 (i.e., 256 gray scale levels). In this embodiment, video data generator 71 generates two types of data ($00_H$ and $FF_H$). A switch 73 is connected to the control terminal of the selector 70 to cause the selector 70 to select one of the inputs A and B. When the switch 73 is set at the position of a contact a, a select signal 74 is set at high level, and the A input is selected. Therefore, the digital video data from the latch circuit 40 is sent to a D/A converter 42 through the selector 70. However, when the switch 73 is set at the position of a contact b, the B input is selected. In this case, data from the video data generator 71 is sent to the D/A converter 42 through the selector 70.

With the above arrangement, assume that the switch 73 is set at the position of the contract b to cause the selector 70 to select the B input. Data $00_H$ is output from the video data generator 71. The output from the D/A converter 42 is compared with a triangle wave 35, and the bias value of the triangle wave 35 is adjusted by a variable resistor 54 such that a predetermined minimum pulse width can be obtained. This indicates a minimum pulse width 63 determined by a voltage value 62 and the triangle wave 35 in FIG. 9. The minimum pulse width is determined according to the image processing characteristics of the apparatus.

An output from the video data generator 71 is set to be $FF_H$ and is compared with the triangle wave 35 to obtain a maximum pulse width. If a voltage value is represented by the value 60 in response to the input $FF_H$ to the D/A converter 42 and the maximum pulse width does not reach a predetermined width, the output voltage level of the D/A converter 42 is changed by a variable resistor 43 from the value 60 to the value 61. As a result, the maximum pulse width can be set to be a predetermined value.

The switch 73 and the video data generator 71 in this embodiment are not limited to the ones as illustrated above. For example, the functions of the switch 73 and the video data generator 71 may be replaced with software under the control of a CPU or the like.

According to this embodiment described above, the image processing apparatus has a normal image processing mode and a PWM modulation pulse width control mode, and either one of the modes can be selected. Therefore, a separate data setting device need not be applied.

Furthermore, readjustment at the time of temporal changes in characteristics of the laser and the drum, e.g., at the time of drum replacement, can be easily performed. In addition, reproducibility of a good image of high quality can be maintained for an extensive period of time.

In the above embodiment, the triangle wave is used as the analog pattern signal, but may be replaced with another analog pattern signal such as a saw-tooth wave signal, a sine wave signal, or a trapezoidal wave signal.

Figure 13:
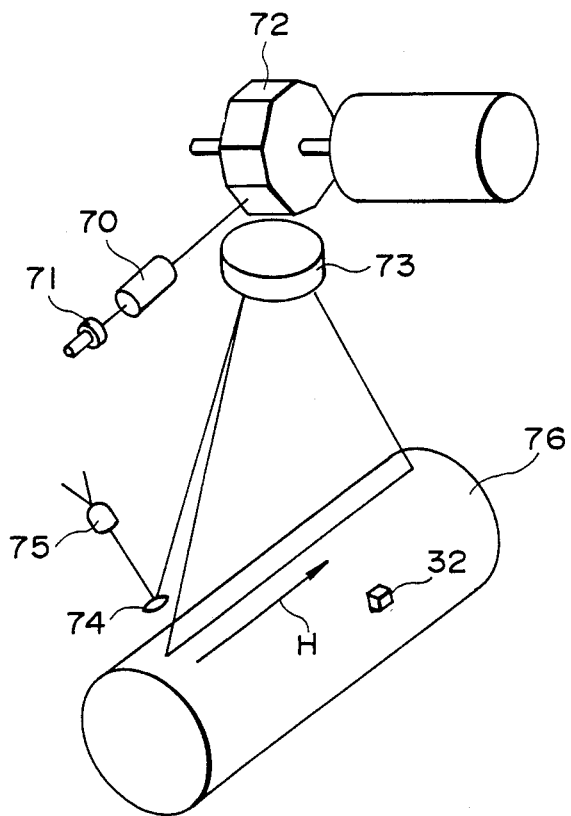
FIG. 13 is a schematic perspective view of image forming unit 34 shown in FIG. 6.

FIG. 13 shows a schematic arrangement of the image forming unit 34 shown in FIG. 6. More specifically, FIG. 13 is a schematic perspective view of a scanning optical system of a laser beam printer (i.e., a raster scanning printer). The scanning system comprises a semiconductor laser 71 for generating a laser beam modulated in response to a pulse width modulated signal described above. A laser beam modulated by the semiconductor laser 71 is collimated by a collimator lens 70 and is deflected by a rotary polygonal mirror (i.e., an applying means) 72 having a plurality of reflecting surfaces. The deflected laser beam is focused by a focusing lens 73 called an f-$\theta$ lens onto a photosensitive drum 76. At the time of laser beam scanning, the beam spot of the one-line scanning is reflected by a mirror 74 and the reflected beam is guided onto a beam detector (photosensor) 75. A beam detection (BD) signal from the beam detector 35 is used as a known horizontal sync signal of the scanning direction H (horizontal direction).

The present invention is not limited to the particular embodiments described above. Various changes and modifications may be made within the scope of the appended claims.

I claim:

1. An image processing apparatus comprising:
   analog image signal generating means for generating an analog image signal;
   means for optionally changing an output range of the analog image signal generated by said analog image signal generating means; and
   pulse width modulated signal generating means for processing an analog image signal generated by said changing means by using an analog pattern signal and for outputting a pulse width modulated signal,
   wherein said analog image signal generating means has a first mode for generating an analog image signal for use in reproducing an image and a second mode for generating an analog image signal of a specified level for use in adjusting a relationship between a level of the analog image signal generated by said changing means and a level of the analog pattern signal.

2. An apparatus according to claim 1, wherein the analog pattern signal comprises a signal having a predetermined period.

3. An apparatus according to claim 2, wherein said pulse width modulated signal generating means comprises means for generating the analog pattern signal, and comparing means for comparing the analog pattern signal generated by said analog pattern signal generating means with the analog image signal generated by said changing means and for outputting the pulse width modulated signal.

4. An apparatus according to claim 3, wherein said changing means comprises a variable resistor.

5. An apparatus according to claim 3, wherein said pulse width modulated signal generating means further comprises means for adjusting a bias level of the analog pattern signal generated by said analog pattern signal generating means.

6. An apparatus according to claim 1, further comprising means for generating a digital image signal having a predetermined number of bits, and wherein said analog image signal generating means comprises D/A converting means for D/A converting the digital image signal generated by said digital image signal generating means.

7. An apparatus according to claim 6, further comprising means for generating a specified digital data signal and means for selecting the specified digital data signal or the digital image signal and for providing the selected signal to said D/A converting means, said specified digital data signal corresponding to the analog image signal of a specified level.

8. An apparatus according to claim 1, wherein the analog pattern signal comprises a triangle wave signal.

9. An image processing apparatus comprising:
image signal generating means for generating an image signal;
data signal generating means for generating a predetermined data signal;
means for selecting one of the image signal and the predetermined data signal; and
means for processing an output from said selecting means by using an analog pattern signal and for outputting a pulse width modulated signal, said processing and outputting means comprising changing means for optionally changing the output from said selecting means.

10. An apparatus according to claim 9, wherein said processing and outputting means further comprises means for D/A converting the output from said selecting means, and said changing means changes a range of an output from said D/A converting means.

11. An apparatus according to claim 10, wherein said changing means comprises a variable resistor.

12. An apparatus according to claim 10, wherein said processing and outputting means further comprises means for generating the analog pattern signal, and comparing means for comparing the analog pattern signal with an output from said changing means and for outputting the pulse width modulated signal.

13. An apparatus according to claim 12, wherein said processing and outputting means further comprises means for manually controlling a bias level of the analog pattern signal generated by said analog pattern signal generating means.

14. An apparatus according to claim 13, wherein the analog pattern signal comprises a triangle wave signal.

15. An apparatus according to claim 10, wherein said predetermined data signal is employed in adjusting a relationship between a level of an output from said changing means and a level of the analog pattern signal.

16. An apparatus according to claim 9, wherein said image signal generating means generates a digital image signal and said data signal generating means generates a predetermined digital data signal.

* * * * *